April 15, 1924.
Z. HSIEH
METER
Filed Feb. 13, 1920
1,490,210
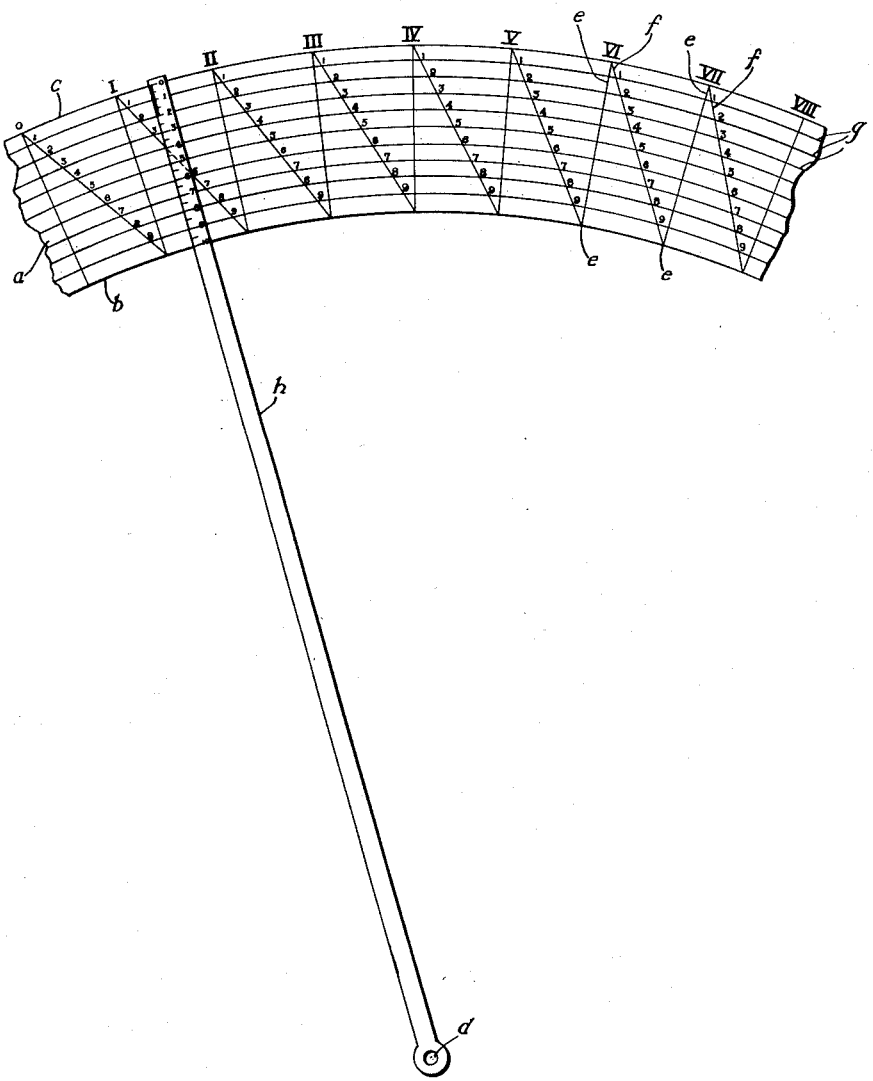
WITNESSES:
INVENTOR
Zen Hsieh
BY
ATTORNEY Patented Apr. 15, 1924.

1,490,210

UNITED STATES PATENT OFFICE.

ZEN HSIEH, OF WILKINSBURG, PENNSYLVANIA, ASSIGNOR TO WESTINGHOUSE ELECTRIC & MANUFACTURING COMPANY, A CORPORATION OF PENNSYLVANIA.

METER.

Application filed February 13, 1920. Serial No. 358,375.

*To all whom it may concern:*

Be it known that I, ZEN HSIEH, a citizen of the Republic of China, and a resident of Wilkinsburg, in the county of Allegheny and State of Pennsylvania, have invented a new and useful Improvement in Meters, of which the following is a specification.

My invention relates to indicating mechanisms for measuring instruments and it has special relation to an indicating device comprising a graduated pointer and a graduated scale, both of novel form, whereby the position of the pointer on the scale may be quickly and accurately determined. More particularly, my invention relates to indicating mechanisms for electrical measuring instruments, such as ammeters, voltmeters and the like, whereby the electrical quantities recorded by such instruments may be determined accurately and precisely with little effort and time on the part of the observer.

Heretofore, in attempting to read instruments of the above mentioned types, considerable difficulty has been experienced by observers in arriving at a substantially exact determination of the position of the pointer relative to the units recorded on a graduated scale of the ordinary instrument dial. Where the smaller graduated units on the dial were disposed on the arc of the same circle with the larger graduated units, the positions assumed by the needle between the graduated units were difficult to interpolate accurately because of the error of parallax.

To alleviate the aforementioned difficulty, a graduated scale in which the smaller graduated units were disposed on diagonal lines between the larger graduated units was conceived. This had the effect of making the graduations of the smaller units more conspicuous, but the difficulty in interpolating between the larger and smaller units was still present. These smaller graduated units appeared larger because of being located on the hypotenuse of the right-angle triangle that was so formed instead of being located on the arc subtended by one of the legs of the triangle, but the probable errors resulting from parallax were increased in the same proportion as were the lengths of the lines representing the graduated units.

An object of my present invention is to provide a dial for an indicating instrument by means of which accurate interpolation may be speedily accomplished without employing costly or intricate apparatus.

With this and other objects in view, which may be incident to the improvement, my invention consists in the parts and combinations to be hereinafter set forth and claimed, with the understanding that the several necessary elements comprising my invention may be varied in their proportions and arrangement without departing from the spirit and scope of the appended claims.

In order to make my invention more clearly understood, I have shown, in the accompanying drawings, means for carrying it into practical effect without limiting the improvements, in their useful applications, to the particular constructions which, for the purpose of explanation, have been made the subject of illustration.

The single figure of the drawings is a diagrammatic view of an embodiment of my invention.

In the drawing, a graduated scale $a$ is formed on an instrument dial between two arcs $b$ and $c$ of circles the centers of which are coincident at $d$. The scale $a$ is graduated at $e$, $e$, by means of lines radiating from the common center $d$. Diagonal lines $f$, $f$, that are shown in this instance as slanting downwardly to the right, connect the upper ends of the larger graduations $e$, $e$, to the lower ends of the similar graduations which are immediately adjacent thereto and at the right. The segment $a$ of the dial is subdivided by ten equally spaced arcs $g$ that are likewise drawn from the common center $d$. In this manner, the radial graduations $e$, $e$, and the diagonal or slanting graduations $f$, $f$, are each divided into ten equal spaces. For the purpose of illustration only, I have numbered the radial graduations $e$ on the segment $a$ from left to right as I, II, III, IV, etc., thus marking on the instrument dial the larger or main unit graduations. Each of the ten equal spaces into which the several diagonal graduations $f$ are divided by the arcs $g$, has been likewise numbered, consecutive ordinals 1 to 9 being applied, as shown.

A graduated pointer $h$, pivoted at the common center $d$ of the arcs comprised on the dial, is adapted to move over the graduated scale, as is usual in indicating instruments. The portion of the pointer $h$ subtended by the segment $a$ is divided into ten equal spaces that coincide with the ten equal spaces into which the graduations $e$ are divided. Each of these ten equal spaces on the pointer may then be subdivided into halves or into ten equal and smaller divisions as indicated between the 0 and the 1 lines and between the 1 and the 2 lines, to thus provide a vernier scale on the pointer.

Assume that the pointer $h$ occupies the position shown in the drawing. It will be noted immediately that the pointer is between graduations No. I and No. II of the main graduations $e$. By a glance at the diagonal line $f$ that is intercepted by the pointer $h$, it will be observed that the line 4 on the graduated edge of the pointer $h$, coincides with the unit 4 of the diagonal line $f$. The reading of the pointer $h$ upon the dial $a$ is, therefore, 1.40 which may be ascertained instantly and with little effort.

The half-division of the unit graduations formed on the pointer $h$ aid the eye in interpolation. For further accuracy, the small graduations between the 0 and the I and between the 1 and the II units on the pointer scale are of great assistance because of the ten-minute graduations between these units. These ten-minute graduations also aid in interpolating for any reading because they give a convenient standard of comparison.

From the foregoing, it is apparent that, by being able to check the reading on the graduated scale with that on the pointer scale an accurate guide is afforded for the eye, and the error of parallax is greatly lessened. This double check assists both in speed and accuracy in the reading of instruments embodying a form of my invention.

I claim as my invention:

1. An indicating device comprising a graduated scale in which the smaller graduations are located on lines forming angles with the larger graduations and a pointer having a vernier scale co-operating with the smaller graduations.

2. A meter comprising a graduated scale in which the smaller graduations are located on lines forming angles with the larger graduations and a pointer having a graduated scale for co-operating with the smaller graduations.

3. An indicating device comprising a scale having a plurality of concentric arcuate division lines, said scale also having radial main division lines and a diagonal line extending from the top of each radial line to the bottom of the next adjacent radial line, scale division marks at the intersections of said arcuate and diagonal lines, and a pointer having a radial scale with division marks corresponding to said first division marks.

4. An indicating device comprising a graduated scale in which the graduations representing the smaller units are located on lines forming angles with the graduations representing the larger units, and a graduated pointer co-operating with the smaller graduations so that both the pointer graduations and the graduations representing the smaller units may indicate like readings.

In testimony whereof, I have hereunto subscribed my name this 28th day of January, 1920.

ZEN HSIEH.